Patented May 15, 1934

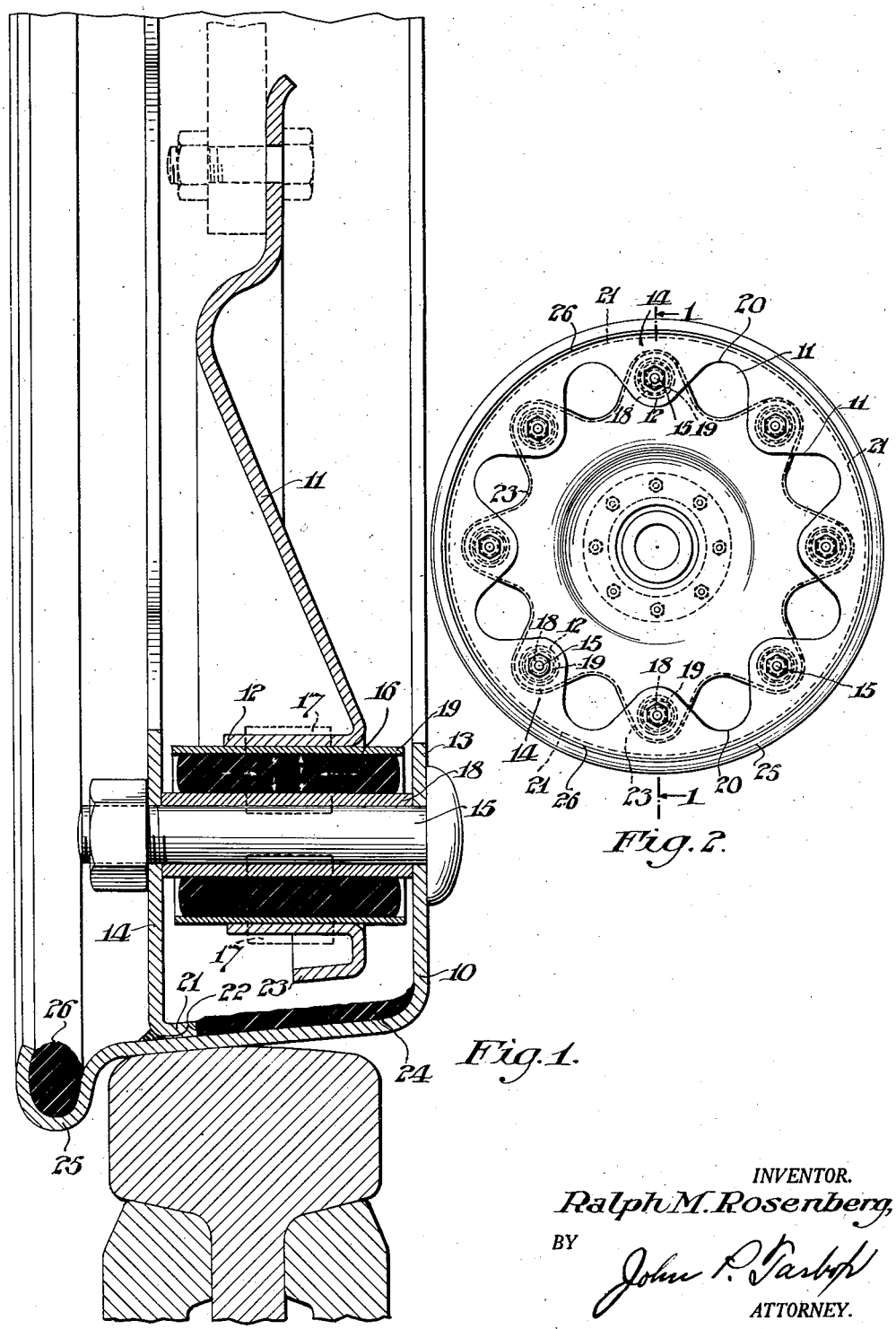

1,958,642

UNITED STATES PATENT OFFICE 1,958,642

SHOCK-INSULATED WHEEL FOR RAILWAY VEHICLES

Ralph H. Rosenberg, Philadelphia, Pa., assignor to Edward G. Budd Manufacturing Company, Philadelphia, Pa., a corporation of Pennsylvania Application July 25, 1932, Serial No. 624,473.

4 Claims. (Cl. 295—11)

The shock insulating wheel of my invention is especially devised for use in connection with railway vehicles wherein in some classes of service it is desired to provide the shock insulating wheels with metallic treads in order the better to break through snow and ice on the track, to operate electric signals having track circuits, detonate torpedoes, and the more efficiently to operate over switches and frogs. It has heretofore been proposed to shock insulate metallic tread by the inter-position of organic material, as for example, rubber. Such inter-position has been in the form of massive blocks or annular rings which are relatively highly expensive, and these highly expensive blocks have been mechanically confined in place by elaborate arrangements of sockets and clamping mechanisms. The outstanding object of my invention is the elimination of complication and inordinate expense.

In the attainment of this object I introduce a metallic tread by means of an annular series of regularly annularly spaced rubber bushings, the rubber of which effects the interconnection primarily through a frictional engagement brought about through an axial mass tension of the bushing itself. In detail, axially extending sockets are formed on one of the members, the tread or the wheel body, co-axial pins are supported from the other and rubber rings are forced into the intervening space in such a manner as to be axially elongated and thereby to exert intensive radial forces effecting the strong frictional engagement between the pin and the socket, thereby not only to retain the parts in their correct axial relation to each other, but also through the intensive radial forces to transmit all the loads to which the wheel is subjected in service, both dead and live loads.

In the accompanying drawing I show one form of my invention though it is susceptible of many others. In the drawing, Fig. 1 is a half axial cross section of such a wheel and portion of a rail with which it is associated, and Fig. 2 is an inside view on a somewhat reduced scale of the entire wheel. The metallic tread of the wheel is designated 10 and the main body of the wheel 11. As is to be seen, both are formed of relatively light gauge stock. The tread may be formed by stamping or by rolling and indeed by any of the methods commonly known in the formation of wheel rims of relatively light gauge stock. The body is preferably formed as a disc-like stamping which may be preliminarily subjected to rolling to increase its strength and stiffness as well as to save metal, especially if it is to be tapered.

In the body 11 of the wheel, in this embodiment, I preferably integrally press out axially extending sockets 12 of circular cross section in regular annular arrangement in annular series as appears in Fig. 2. On the tread 10 I form preferably a radially inwardly extending integral annular flange 13. Axially removed from this flange I secure to the inner face of the flange 10 a substantially parallel and co-extensive flange 14. These flanges I utilize to support pins 15 of relatively large diameter which extend axially through the sockets 12. The pins may be in the form of bolts as shown.

Intervened between the pins 15 and the inner faces of the sockets 12 are rubber bushings 16 which consist of rubber rings initially of substantially the dotted line form 17 pressed into this space in such manner that they are axially elongated and thereby placed under a heavy axial tension in the direction of the arrows, thereby to exert a radially directed intensive force in the direction of the radial arrows shown. This radially exerted force of the mass tension of the rubber ring 16 effects a strong frictional engagement of the rubber with the metallic surfaces engaged, a frictional engagement so strong that the parts are not only held during use permanently in their corrective relative axial position, but also all loads of whatsoever nature are transmitted properly from the wheel body to the wheel tread and vice versa.

In such transmission especially are the vibrations and noises emanating from the wheel tread through and by virtue of trackway irregularities, track devices, and what not, shock and sound insulated by the bushings 16.

Very obviously by varying the size and number of the bushings 16 and particularly the sizes of the pins 15, the wheel may be adapted to carry any desired loads whatsoever through and by virtue of the bushings 16. Inasmuch as there is no load carrying metallic connection between the body 11 and the tread 10, there can be no shock and no noise carried from the one part to the other except as the bushing 16 may permit it. The bushing being of the correct proportion and tensioning and the correct material, especially the proper rubber composition, substantially no shocks and no noises can be transmitted from the tread to the body.

Several structural details form part and parcel of my invention, particularly may it be said that the bushings 16 as articles of manufacture are pre-assembled upon inner and outer tubular members 18 and 19, the article so constituted by parts 16, 18 and 19, being a separate article of manufacture. The inner tube 18 acts as a spacer upon the pin 15 between the flanges 10 and 14. The outer tube 19 is shorter and does not contact with either flange. Nor does the rubber 16 contact with either flange 10 or 14.

Preferably also the metal for the flange 14 is obtained from the metal of the body 11, being scalloped out of the periphery of the disc 11 along the line 20 as indicated in Fig. 2. The disc 11 is originally made of appropriate diameter to afford this member 14 by blanking it along line 20 and also to afford a foundation flange 21 for the ring 14. Flange 21 may be secured to the tread 10 in any desired manner. Arc welding 22 is shown.

The body 11 is itself provided with an outturned flange 23 for strengthening purposes.

The relatively thin gauged wheel tread 10 is further sound insulated by the placement on its interior face in any known manner of sound deadening material 24. This may be in the form of rubber or asphalt emulsion sprayed in place or other material. For the same purpose the flanged portion 25 of the tread is provided with an interior deposit 26 of sound deadening material of any nature.
Irrespective of the circumstantial terminology of the claims ultimately annexed hereto, the spirit of the invention should govern the coverage which they afford.

What I claim is:
1. A shock insulated metallic wheel comprising a pressed metal annulus including a tread portion and an integral flange extending radially inwardly from one end of the tread portion, another flange secured to the tread portion and extending inwardly from its end opposite the first-named flange, a pressed metal body, the body being provided with a plurality of axially extending sockets and the tread with a plurality of axially extending pins secured to said flanges and extending through the sockets and adapted to lie co-axial therewith, together with rubber bushings between the pins and the sockets constituting the sole load carrying connection between the tread and the body.

2. A shock insulated metallic wheel comprising a metallic tread, a pressed metal body, the body being provided with a plurality of axially extending sockets and the tread with a plurality of axially extending pins extending through the sockets and adapted to lie co-axial therewith, together with rubber bushings between the pins and the sockets constituting the sole load carrying connection between the tread and the body, said sockets being integrally pressed out of the wheel body.

3. A shock insulated metallic wheel comprising a metallic tread, a metallic body, the body being provided with a plurality of axially extending sockets and the tread with a plurality of axially extending pins extending through the sockets and adapted to lie co-axial therewith, together with rubber bushings between the pins and the sockets constituting the sole load carrying connection between the tread and the body, said sockets being integrally pressed out of radial extensions of the wheel body, and the said pins being carried by radially inwardly extending flanges at opposite ends of the tread.

4. A shock insulated wheel for railway vehicles comprising a relatively thin metallic tread lined on a portion of its interior with sound deadening material spaced from other wheel parts, a wheel body, and shock insulating means independent of the sound deadening material connecting the tread with the wheel body.

RALPH H. ROSENBERG.